United States Patent
Saiga et al.

(10) Patent No.: US 9,526,302 B2
(45) Date of Patent: Dec. 27, 2016

(54) COVER-MATERIAL FASTENING CLIP

(71) Applicant: YKK Corporation, Tokyo (JP)

(72) Inventors: Shinsuke Saiga, Tokyo (JP); Yoshitomo Iyoda, Tokyo (JP); Tetsuya Yoshino, Tokyo (JP)

(73) Assignee: YKK Corporation (JP)

( * ) Notice: Subject to any disclaimer, the term of this patent is extended or adjusted under 35 U.S.C. 154(b) by 96 days.

(21) Appl. No.: 14/445,352

(22) Filed: Jul. 29, 2014

(65) Prior Publication Data
US 2015/0033516 A1 Feb. 5, 2015

(30) Foreign Application Priority Data

Jul. 30, 2013 (JP) .............................. 2013-004381 U (51) Int. Cl.
| | |
|---|---|
| *A44B 99/00* | (2010.01) |
| *B60N 2/58* | (2006.01) |
| *A44B 17/00* | (2006.01) |
| *A44B 13/00* | (2006.01) |

(52) U.S. Cl.
CPC ........... *A44B 17/0064* (2013.01); *A44B 13/00* (2013.01); *B60N 2/5825* (2013.01); *A44B 99/00* (2013.01); *Y10T 24/45251* (2015.01)

(58) Field of Classification Search
CPC ..... A44B 17/0064; A44B 13/00; A44B 99/00; B60N 2/5825; B60N 2/5816; Y10T 24/45251; Y10T 24/44026; Y10T 24/309; Y10T 24/30; B68G 7/12; Y10S 297/01; Y10S 297/02; A47C 31/023
See application file for complete search history.

(56) References Cited

U.S. PATENT DOCUMENTS

2012/0284974 A1* 11/2012 Yamamoto ........... A47C 31/023
24/458

FOREIGN PATENT DOCUMENTS

| JP | 2010-5213 | * 10/2010 |
| JP | 2012-235911 A | 12/2012 |
| WO | 2012/017986 A1 | 2/2012 |

* cited by examiner

*Primary Examiner* — Jack W Lavinder
(74) *Attorney, Agent, or Firm* — Kilpatrick Townsend & Stockton LLP (57) ABSTRACT

There is provided a cover-material fastening clip for connecting a cover material and a cushion material. An engaging part engaged with the cover material. A hook is provided below the engaging part and is formed with: a claw-shaped part engaged with a wire provided in a groove of the cushion material; and a jig receiving part engaged with a jig for separating the hook from the wire. A position at which the jig receiving part is engaged with the jig is located at a side opposite to the engaging part relative to a position at which the hook is engaged with the wire. When the jig is engaged with the jig receiving part and is pulled up, the clip is rotated about the wire and the wire is separated from the claw-shaped part, so that the connection between the cover material and the cushion material is released.

10 Claims, 6 Drawing Sheets

COVER-MATERIAL FASTENING CLIP

The disclosure of Japanese Utility Model Application No. 2013-004381 filed on Jul. 30, 2013, including specification, drawings and claims is incorporated herein by reference in its entirety.

TECHNICAL FIELD

The present invention relates to a cover-material fastening clip used for fastening a cover-material that covers a surface of a chair, a seat and the like.

BACKGROUND

Conventionally, in a typical chair to be used in a room or in a typical vehicular seat, a cushion material or a soft pad is arranged on a part to be touched by a human body such as a seat surface and a back rest and a surface of the cushion material or the soft pad is covered with a cover-material. A variety of structures are employed for fastening the cover-material. For example, a structure capable of fastening the cover-material and concealing an outward appearance thereof has been known in which a wire is arranged in a groove of a cushion material, clips are arranged on a backside of the cover-material and the clips are engaged with the wire to thus fasten the cover-material.

For example, a fastening clip disclosed in Patent Documents 1 and 2 has a chuck part configured to be engaged to an end member for engagement, which is attached to a cover-material and a hook part configured to be engaged with a wire provided in a groove of a cushion material. The hook part has a guide lever and a hook which are arranged to face each other side by side in a lateral direction, and the wire is inserted between the guide lever and the hook, so that the guide lever is outwardly bent to widen a gap between the guide lever and the hook. When the wire is further inserted, the hook is engaged with the wire inserted into the gap.

According to the fastening clip disclosed in Patent Document 1, a lower end portion of the hook part is formed with a jig hanging part having a shape bent toward a side opposite to a part with which the wire is engaged. The jig hanging part is used to separate the fastening clip once attached from the wire. A jig such as a screwdriver is inserted into a groove shape of the bent jig hanging part and a hook material is forcibly elastically deformed outwardly, so that a gap with a guide piece is widened to separate the wire.

The cover-material fastening clip disclosed in Patent Document 2 is also formed with a jig receiving part in the middle of the hook part in a longitudinal direction. When separating the fastening clip from the wire, an operating jig is inserted into the jig receiving part and the hook is laterally deviated or inclined relative to the wire, so that the engagement between the hook and the wire is released.

Patent Document 1: Japanese Patent Application Publication No. 2012-235911A

Patent Document 2: International Patent Application Publication No. WO/2012/017986

According to the above-described related art, when separating the fastening clip, the jig is inserted in the jig hanging part and is laterally moved in parallel to be deviated or inclined relative to the wire, so that the engagement of the hook is released from the wire. However, it is difficult to know how to apply the force to the jig in order to release the engagement. In addition, it is necessary to apply the force to the jig in a correct direction, considerable skill is required to release the engagement. This is troublesome. In particular, since the jig is easily separated from the jig hanging part when the jig is upwardly pulled up, it is necessary to apply the force to the jig also in a horizontal direction while paying attention so that the jig is not separated from the jig hanging part. Thus, the operability is poor. Furthermore, when moving the jig in the horizontal direction or inclining the jig, the cushion material around the jig becomes an obstacle, so that it is necessary to push and deform the cushion material to move the jig. Also from this standpoint, the strong force is required, it takes time to perform the operation and the fatigue of an operator is increased.

SUMMARY

It is therefore an object of the present invention to provide a cover-material fastening clip capable of being separated from a wire disposed inside a cushion material by a simple operation using a jig and thus improving operation efficiency.

According to an aspect of the embodiments of the present invention, there is provided a cover-material fastening clip for connecting a cover material and a cushion material, the cover-material fastening clip comprising: an engaging part configured to be engaged with an end member for engagement provided at an end edge of the cover material; and a hook configured to be engaged with a wire provided in a groove of the cushion material, wherein the hook is provided below the engaging part and is formed with: a claw-shaped part protruding laterally and configured to be engaged with the wire; and a jig receiving part provided at a side opposite to the claw-shaped part and configured to be engaged with a jig for separating the hook from the wire, wherein a position at which the jig receiving part is engaged with the jig is located at a side opposite to the engaging part relative to a position at which the hook is engaged with the wire, and is located lateral to the hook, and wherein when the jig is engaged with the jig receiving part and is pulled up in a state where the hook is engaged with the wire, the cover-material fastening clip is rotated about an axis of the wire and the wire is separated from the claw-shaped part of the hook, so that the connection between the cover material and the cushion material is released.

The engaging part, the hook and the jig receiving part may be integrally formed of a synthetic resin.

The hook may have an extension part extending downwardly from the engaging part, and the jig receiving part may extend parallel with the extension part, a tip end of the jig receiving part may be positioned above an engaging claw base part of the engaging part, and an insertion opening into which the jig is inserted may be formed between the tip end of the jig receiving part and the engaging part.

The hook may have: an extension part extending downwardly from the engaging part; the claw-shaped part bent laterally from a tip end of the extension part and inclined towards the engaging part; and a flange part extending in an opposite direction to an extension direction of the claw-shaped part of the extension part, and a tip end of the flange part may be inclined in a direction away from the engaging part and is provided with the jig receiving part.

An inner side surface of the jig receiving part, which faces the extension part or an inner side surface of the extension part, which faces the jig receiving part may be provided with an engaging convex part.

The cover-material fastening clip may further comprise a guide lever extending integrally from the engaging part and facing a tip end of the claw-shaped part of the hook, and the guide lever may be formed so as to extend downwardly beyond the tip end of the claw-shaped part of the hook.

A bottom part of a U-shaped groove between the jig receiving part and the extension part may be a jig holding space for engagement with the jig, an inner side surface of the jig receiving part, which faces the extension part or an inner side surface of the extension part, which faces the jig receiving part may be provided with an engaging convex part, a gap between the engaging convex part and the extension part or the jig receiving part may be set to be smaller than an outer diameter of an engaging part of the jig, and when the engaging part of the jig is inserted between the extension part and the jig receiving part, the engaging part may collide with the engaging convex part and the jig receiving part may be elastically deformed to widen the gap, and when the engaging part passes over the engaging convex part, the engaging part may be engaged with the engaging convex part.

With the cover-material fastening clip according to the aspect of the embodiments of the present invention, it is possible to separate the cover-material fastening clip from the wire by the jig with a simple operation, so that the operation efficiency is good. In particular, since the jig is engaged with the jig receiving part by the engaging protrusion simply by inserting the jig from above, the jig can be easily inserted, is not easily separated and can be easily attached. By simply pulling up the jig, the cover-material fastening clip is rotated about the axis of the wire and the wire is easily separated through the gap which is widened as the guide lever is elastically deformed, so that the engagement can be simply released. Furthermore, since the cushion material is not an obstacle and the operation can be made in the groove, it is not necessary to push and deform the cushion material, so that it is possible to effectively perform the operation with the weak force.

DETAILED DESCRIPTION OF THE EMBODIMENTS

Hereinafter, illustrative embodiments of the present invention will be described with reference to the drawings.

Figure 2:
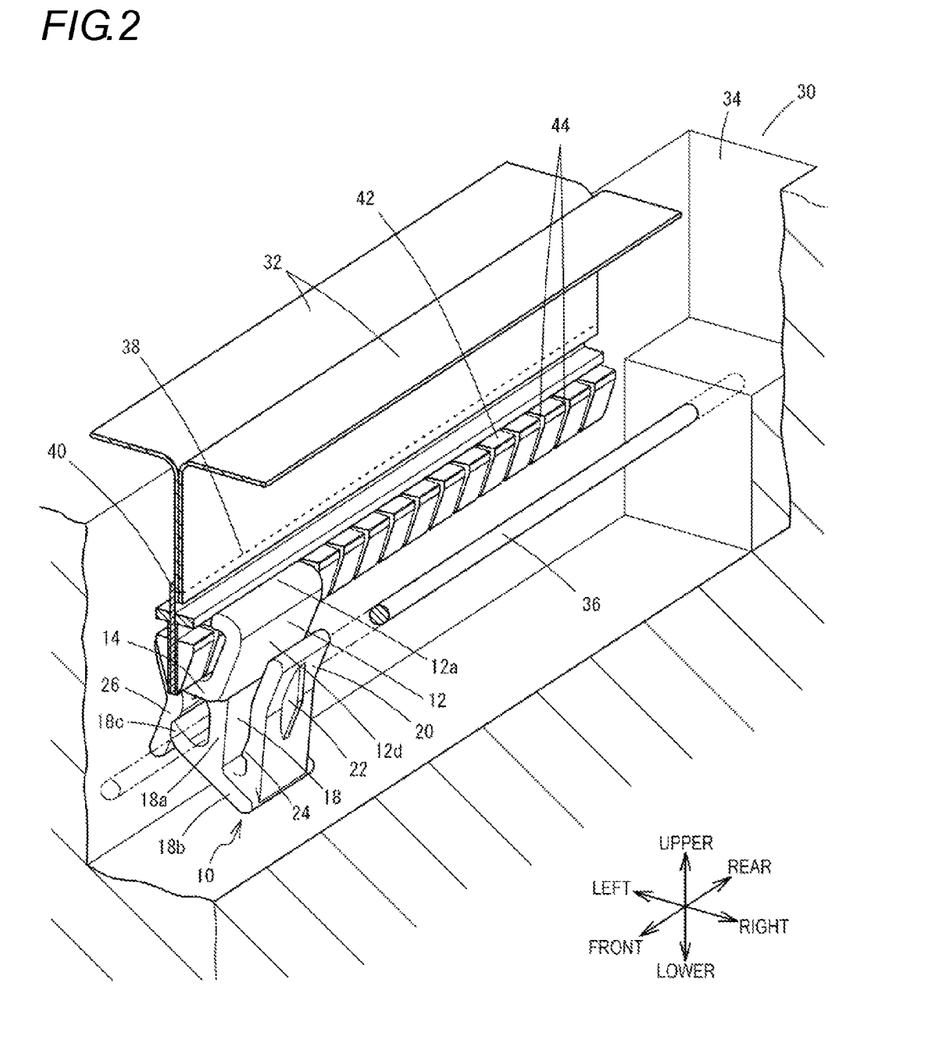
FIG. 2 is a perspective view showing a method of using the cover-material fastening clip according to the illustrative embodiment.

In the descriptions of a cover-material fastening clip 10, the directions are described on the basis of a state shown in FIG. 2. For example, the front and rear direction coincides with an extension direction of a wire 36 arranged at a deep part of a groove 34 of a cushion material 30 which will be described later, coincides with an extension direction of an end edge of a cover-material or coincides with an extension direction of an end edge of an end member 42 for engagement, which will be described later. The upper and lower direction is a direction perpendicular to the front and rear direction, which coincides with a depth direction of the cushion material 30, coincides with a direction perpendicular to a surface of a cover-material 32 provided on the cushion material 30 or coincides with a hanging direction of the end member 42 for engagement stitched to the cover-material 32. Also, a direction along which the end member 42 for engagement is inserted in the groove of the cushion material 30 and is engaged with the wire 36 coincides with the upper and lower direction. A direction perpendicular to the front and rear direction and the upper and lower direction refers to the right and left direction. A direction parallel with the right and left direction refers to a lateral direction.

Figure 1:
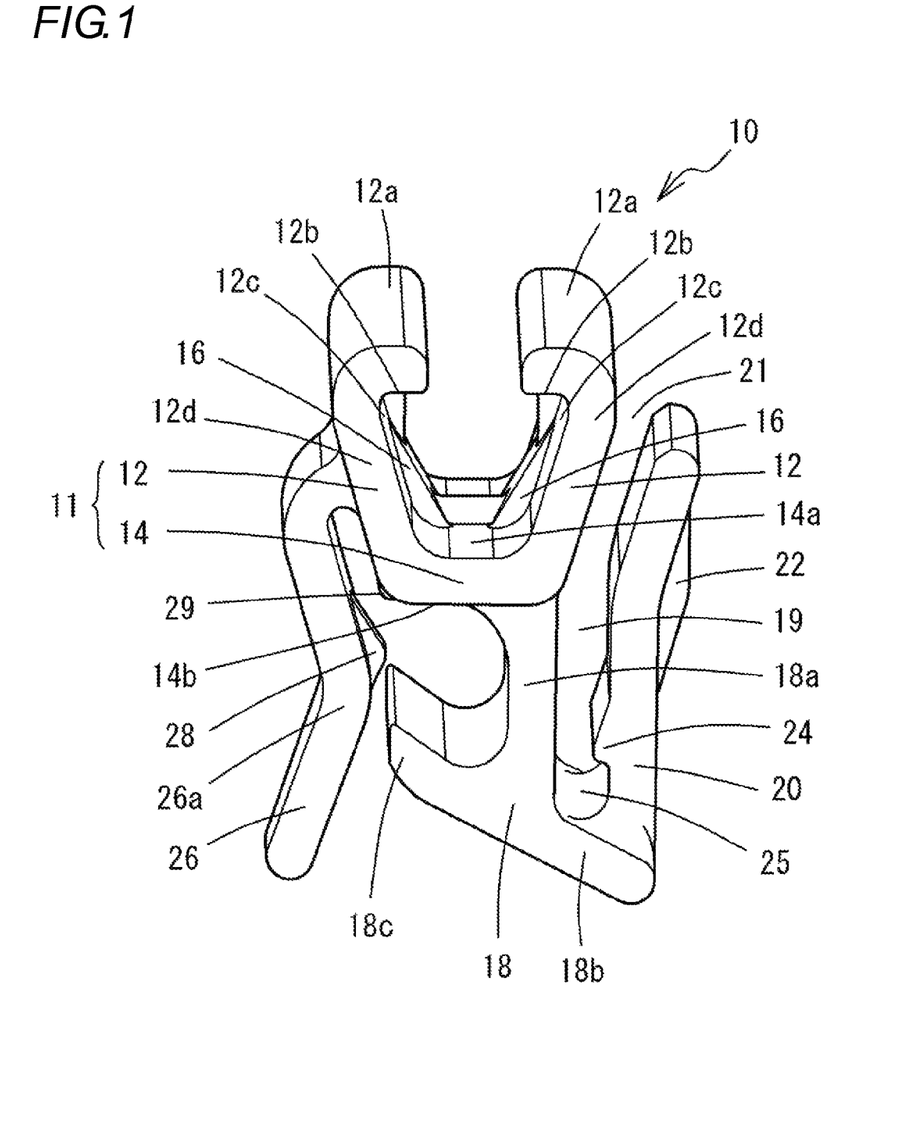
FIG. 1 is a perspective view of a cover-material fastening clip according to an illustrative embodiment of the present invention.

FIG. 1 shows an illustrative embodiment of the present invention. In this illustrative embodiment, the cover-material fastening clip 10 has a pair of engaging claws 12 having arm parts 12d formed to face each other. Base end parts of the arm parts 12d (which are also base end parts of the engaging claws 12) are integrally formed from both sides of an upper surface 14a of the engaging claw base part 14 (which is also referred to as one surface of an engaging claw base part 14). The engaging claws 12 are formed so as to protrude upwardly from the upper surface 14a in FIG. 1 (hereinafter, the upward and downward direction in FIG. 1 is referred to as the upper and lower direction) and a gap between the engaging claws 12 in the right and left direction is widened as they are directed upwards. An engaging part 11 is formed of the engaging claws 12 and the engaging claw base part 14. Tip ends 12a of the engaging claws 12 are respectively bent inwardly, i.e., in a mutually approaching direction. Each of the tip ends 12a has an engaging surface 12b that faces the engaging claw base part 14 and is engaged with the end member 42 for engagement. The engaging surface 12b is formed to be substantially parallel with the upper surface 14a of the engaging claw base part 14. The end member 42 for engagement, which will be described later, is accommodated in and engaged with a space surrounded by the pair of engaging claws 12 and the engaging claw base part 14.

Inner surfaces 12c of the arm parts 12d of the pair of engaging claws 12, which face each other, are provided with stoppers 16. The stopper 16 is a rib that is provided at a middle position of the engaging claws 12 in a thickness direction (which is also referred to as the front and rear direction) intersecting with the opposing direction of the engaging claws 12. The stopper 16 starts from the engaging surface 12b of the engaging claw 12, reaches the upper surface 14a of the engaging claw base part 14 along the inner surface 12c and has a substantial U shape, like the inner surface 12c and the upper surface of the engaging claw base part 14. A width of the stopper 16 in the thickness direction is the narrowest at a part close to the engaging surface 12b, is the widest at a border part between the inner surface 12c and the upper surface 14a and has a middle width at a central part of the upper surface 14a.

The engaging claw base part 14 is provided with a hook 18 at a lower surface 14b (which is also referred to as the other surface of the engaging claw base part 14) opposite to the upper surface 14a. The hook 18 has an extension part 18a which is provided at one end portion of the lower surface 14b in the facing direction of the pair of engaging claws 12 and extends downwardly at a substantial right angle relative to the lower surface 14b, and a claw-shaped part 18c which is bent from a tip end of the extension part 18a in a left direction of FIG. 3 and is inclined upwardly towards the engaging claw base part 14. A tip end of the claw-shaped part 18c is formed so as to be inclined at an angle closer to the upper and lower direction than the inclined angle of the claw-shaped part 18c, and is formed to be tapered. The hook 18 has a flange part 18b extending in an opposite direction (a right direction of FIG. 3) to the extension direction of the claw-shaped part 18c. The flange part 18b is inclined so that a tip end thereof is directed downwards.

Figure 3:
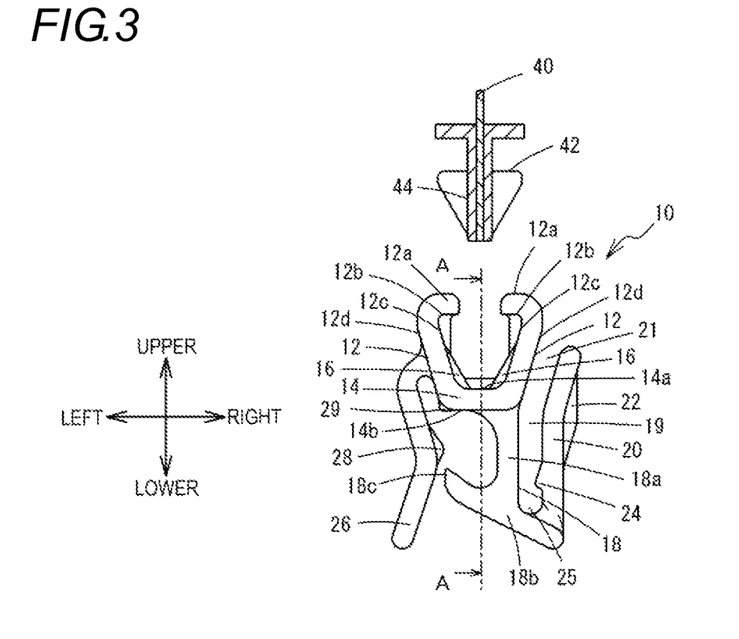
FIG. 3 is a front view showing the method of using the cover-material fastening clip according to the illustrative embodiment.

An end portion of the flange part 18b of the hook 18, which is at a side opposite to the claw-shaped part 18c, is provided with a jig receiving part 20 for receiving a jig 46, which will be described later. The jig receiving part 20 is a plate-shaped member that extends from the end portion of the flange part 18b towards the engaging claw 12 with a gap with respect to and substantially in parallel with the extension part 18a and has a tip end 20a which reaches a position slightly lower than the tip end 12a of the engaging claw 12 and is positioned lateral to the engaging claw 12. That is, the jig receiving part 20 extends in parallel with the extension part 18a of the hook 18, and the tip end thereof is located at a side of the engaging part 11 relative to the engaging claw base part 14. An insertion opening 21 into which the jig 46 is inserted is formed between the tip end of the jig receiving part 20 and the engaging part 11, and a groove part 19 is continuous from the insertion opening 21. The groove part 19 into which the jig 46 is inserted is surrounded and formed by the extension part 18a, the flange part 18b and the jig receiving part 20. A bottom part (an upper surface of the flange part 18b) of the U-shaped groove part 19 between the jig receiving part 20 and the extension part 18a of the hook 18 is a jig holding space 25 with which the jig 46 is engaged. The jig holding space 25 is surrounded by the extension part 18a, the flange part 18b, the jig receiving part 20 and an engaging convex part 24, which will be described later, and is engaged with an engaging part 52b of the jig 46. The jig receiving part 20 is provided with a bent part which is slightly bent with the outward inclination of the upper part of the engaging claw 12, in the vicinity of the engaging claw base part 14. An outer side surface (a right side surface) of the bent part of the jig receiving part 20 is provided with a rib 22 extending along a longitudinal direction of the jig receiving part 20. An inner side surface (an opposite side surface to the groove part 19 into which the jig 46 is inserted) of the jig receiving part 20, which faces the extension part 18a of the hook 18, is provided with the engaging convex part 24 in the vicinity of the flange part 18b. The engaging convex part 24 is a rib having a triangular shape towards the extension part 18a and protrudes so as to be closer to the extension part 18a as it is directed downwards. That is, a surface of the engaging convex part 24 close to the flange part 18b is positioned at a substantial right angle relative to the extension direction of the jig receiving part 20, and a surface thereof opposite to the flange part 18b intersects with the extension direction of the jig receiving part 20 at an obtuse angle. Thereby, when the engaging part 52b of the jig 46 is inserted into the groove part 19, the engaging part 52b passes over the surface intersecting at the obtuse angle and is engaged with the engaging convex part 24. At the engaged state with the cover-material clip, the engaging part 52b of the jig 46 has a circular shape in a cross-section of a plane formed in the upper and lower and right and left directions, has a rod shape, i.e., a circular cylindrical shape longer than a size of the jig receiving part 20 in the front and rear direction, and is connected to a holding part 48 with support parts 52a at both end portions of the engaging part 52b of the circular cylindrical shape, thereby forming the jig 46. At a state where the engaging part 52b is engaged with the engaging convex part 24, the engaging part 52b can be rotated in the jig holding space 25.

The one engaging claw of the pair of engaging claws 12, which is at a side opposite to the engaging claw 12 at which the jig receiving part 20 is provided, is integrally provided with a guide lever 26. The guide lever 26 is provided in the vicinity of the middle of the engaging claw 12 in the protruding direction thereof, extends downwardly with being bent, passes through the lateral side of the claw-shaped part 18c of the hook 18 and reaches a lateral side of the flange part 18b in the vicinity of the lower end portion thereof. The guide lever 26 is provided with a bent part 26a extending in parallel with the inclination toward the lower-inner side of the arm part 12d of the engaging claw 12 and is slightly bent outwardly in the vicinity of the claw-shaped part 18c of the hook 18. An inner side surface of the guide lever 26, which faces the hook 18, is provided with an engaging protrusion 28 that is positioned slightly above an extension line of the claw-shaped part 18c. The engaging protrusion 28 has a triangular shape towards the claw-shaped part 18c. In the meantime, the lower surface 14b of the engaging claw base part 14 is provided with a guide protrusion 29 extending towards the guide lever 26.

Figure 4:
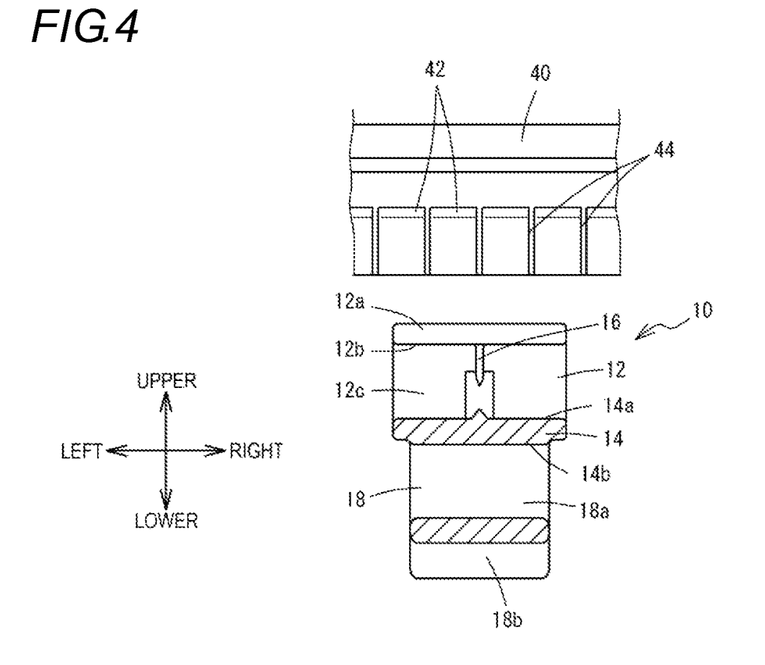
FIG. 4 is a longitudinally cross-sectional view showing the method of using the cover-material fastening clip according to the illustrative embodiment.

Next, a method of using the cover-material fastening clip 10 is described with reference to FIGS. 2 to 4. As shown in FIGS. 2 to 4, the cover-material fastening clip 10 is used for tightly fastening the cover-material 32 at a predetermined position on the surface of the cushion material 30 for a vehicular seat.

Here, the cushion material 30 and the cover-material 32 are explained. The cushion material 30 is a synthetic resin foam material such as foamed polyurethane, which is formed in conformity to a shape of the seat. The cushion material 30 is formed with the groove 34 for the cover-material fastening, and the wire 36 is arranged in the groove 34. The wire 36 is a metallic rod material and is incorporated by an insert method upon the forming of the cushion material 30.

The cover-material 32 is a synthetic resin sheet and the like, covering the surface of the cushion material 30 and has a stitched part 38 at a portion corresponding to the groove 34 of the cushion material 30. The stitched part 38 is formed by combining end edges of a pair of cover-materials 32 so as to inwardly face each other and overlapping and stitching a tape 40 for engagement. The end member 42 for engagement is integrally provided at a side edge of the tape 40 for engagement at a side opposite to the stitched part 38. The end member 42 for engagement is formed of a synthetic resin, has a substantially V-shaped cross-sectional shape and is formed along a longitudinal direction of the tape 40 for engagement. The end member 42 for engagement is mounted to the tape 40 for engagement by performing an insert molding on one side edge of the tape 40 for engagement. The end member 42 for engagement has a size so that it can be fitted in the pair of engaging claws 12 of the cover-material fastening clip 10, and is formed with engaging grooves 44 at an equal interval along a longitudinal direction of the tape 40 for engagement. The engaging groove 44 has a width and a depth so that the stopper 16 of the cover-material fastening clip 10 can be inserted therein.

When tightly fastening the cover-material 32 to the cushion material 30, the cover-material fastening clip 10 is attached to any position of the end member 42 for engagement of the tape 40 for engagement attached to the cover-material 32. A plurality of the cover-material fastening clips 10 is attached at an equal interval along the longitudinal direction of the end member 42 for engagement. When the end member 42 for engagement is pushed in between the pair of engaging claws 12 of the cover-material fastening clip 10, the pair of engaging claws 12 is elastically deformed and widened, so that the end member 42 for engagement passes therethrough. When the end member 42 for engagement has passed, the elastic deformation of the engaging claws 12 is restored, so that the tip ends 12a of the pair of engaging claws 12 cover the end portion of the end member 42 for engagement at a side of the stitched part 38 and the end member 42 for engagement is fitted between the pair of engaging claws 12 and thus is not separated. At this time, the stoppers 16 of the engaging claws 12 are inserted in the engaging grooves 44 of the end member 42 for engagement, so that the cover-material fastening clip 10 is stopped at a predetermined position without being moved in the longitudinal direction of the end member 42 for engagement.

The stitched part 38 of the cover-material 32 having the cover-material fastening clip 10 attached thereto is then matched with the groove 34 of the cushion material 30 and the hook 18 of the cover-material fastening clip 10 is brought into contact with the wire 36 and pressed. The wire 36 is contacted to the flange part 18b of the hook 18 and is moved towards a gap between the claw-shaped part 18c and the guide lever 26 along the inclination of the flange part 18b. The gap is smaller than a diameter of the wire 36, so that the wire 36, as it is, cannot pass through the gap. Further, when the cover-material fastening clip 10 is pressed from above, the guide lever 26 and the hook 18 are elastically deformed and widened. When the gap becomes wider than the diameter of the wire 36, the wire 36 passes through the gap while passing over the engaging protrusion 28 of the guide lever 26 and enters the space surrounded by the claw-shaped part 18c, the engaging claw base part 14 and the guide lever 26. After the wire 36 passes, the elastic deformation of the guide lever 26 is restored and the gap is again narrowed, so that the wire 36 is prevented from being separated.

Since the base end portion of the guide lever 26 is bent from the midst of the engaging claw 12, a U-shaped pit is formed between the guide lever 26 and the engaging claw 12, so that the wire 36 may unintentionally enter the pit. However, since the lower surface 14b is provided with the guide protrusion 29 so as to block the pit, it is possible to prevent the wire 36 from unintentionally entering the pit. Furthermore, the guide protrusion 29 smoothly guides the wire 36 having passed through the gap between the guide lever 26 and the claw-shaped part 18c to the inside of the claw-shaped part 18c. Thereby, the cover-material fastening clip 10 is engaged with the wire 36 and the cover-material 32 attached to the cover-material fastening clip 10 is attached to the surface of the cushion material 30 with being inserted in the groove 34.

Figure 7:
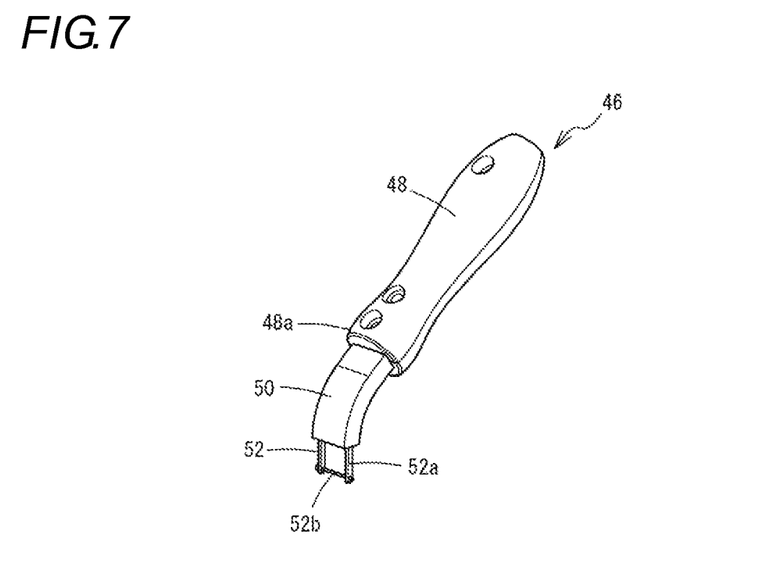
FIG. 7 is a perspective view showing a jig for releasing engagement of the cover-material fastening clip according to the illustrative embodiment.

When separating the cover-material fastening clip 10 from the wire 36, the jig 46 shown in FIG. 7 is used. Here, the jig 46 is explained. The jig 46 has the rod-shaped holding part 48 that is long in one direction. One end portion 48a of the holding part 48 is provided with a thin quadrangular prism-shaped insertion part 50. The insertion part 50 protrudes laterally in parallel with a longitudinal direction of the holding part 48 and a sectional shape thereof intersecting with the protruding direction is a rectangular shape, which is long in one direction. A tip end of the insertion part 50 is provided with the engaging member 52. The engaging member 52 has a pair of rod-shaped support parts 52a which are attached to the vicinity of a short side of the rectangular shape of the insertion part 50, and a rod-shaped engaging part 52b connecting tip ends of the pair of support parts 52a. The engaging part 52b preferably has a circular cylindrical shape having a circular section. However, the cross-section is not necessarily truly circular and may be elliptical, triangular or polygonal. At a state where the cover-material fastening clip 10 is engaged with the jig 46, a direction of the engaging part 52b connecting the pair of support parts 52a coincides with the extension direction of the wire 36 at a state where the cover-material fastening clip 10 is engaged to the wire 36 or the front and rear direction of the cover-material fastening clip 10. Also, an interval between the pair of support parts 52a is larger than the size of the jig receiving part 20 in the front and rear direction, and sizes of the engaging part 52b and the tip end of the insertion part 50 are longer than the depth of the groove part 19 of the jig receiving part 20. Thereby, at a state where the engaging part 52b of the jig 46 is engaged in the jig holding space 25, when the cover-material fastening clip 10 rotates about the engaging part 52b, the cover-material fastening clip 10 can smoothly rotate without being interfered with the support parts 52a and can be separated from the wire 36. The insertion part 50 is gently bent in one direction intersecting with the engaging part 52b.

Figure 5:
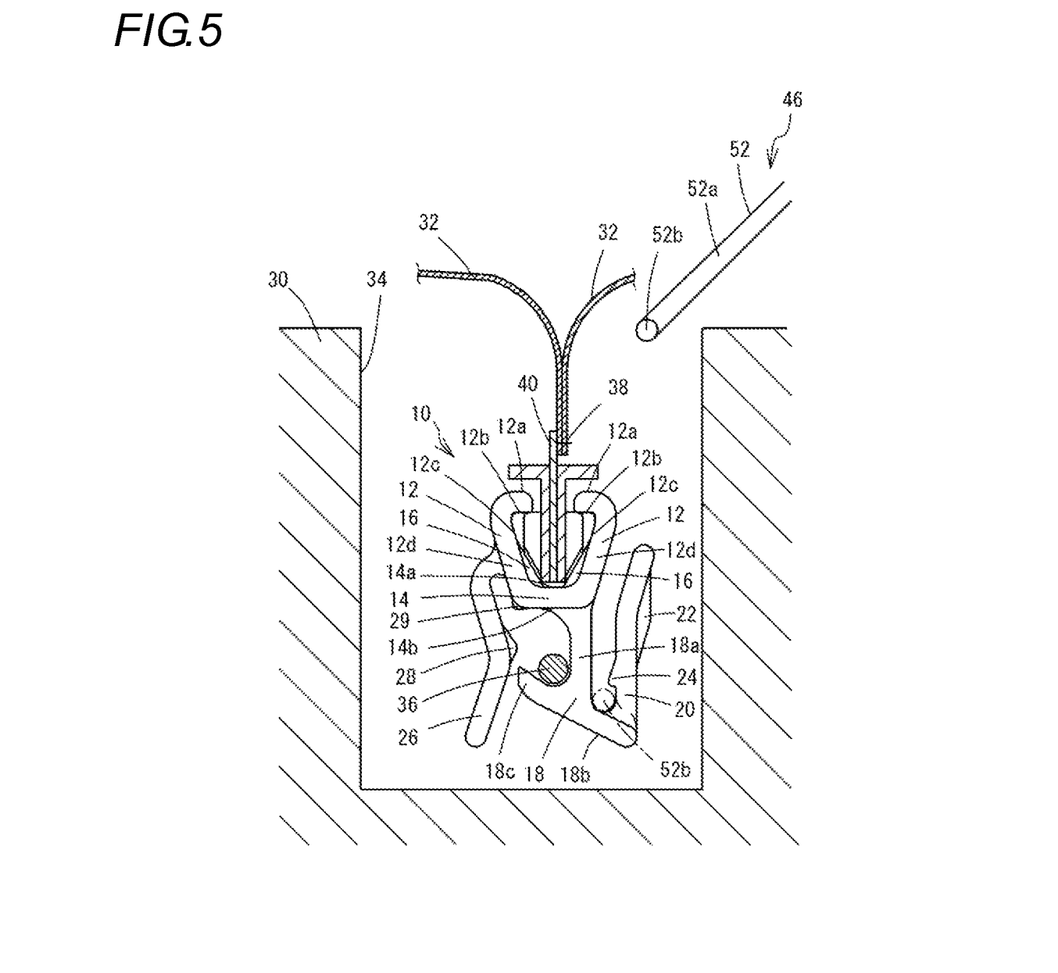
FIG. 5 is a longitudinally cross-sectional view showing the method of using the cover-material fastening clip according to the illustrative embodiment.

When separating the cover-material fastening clip 10 from the wire 36, the jig 46 is inserted into the groove 34 of the cushion material 30 at a side of the jig receiving part 20 of the cover-material fastening clip 10, and the engaging member 52 is inserted in parallel and pressed between the engaging claw 12 and the jig receiving part 20, as shown in FIG. 5. Thereby, the engaging part 52b of the engaging member 52 of the jig 46 abuts on the engaging convex part 24 of the jig receiving part 20. When the jig is further pressed, the jig receiving part 20 is elastically deformed and thus widened. At this time, since there is the rib 22, the lateral force is sufficiently transmitted to the base end portion of the jig receiving part 20. When the engaging part 52b of the engaging member 52 passes, the shape of the jig receiving part 20 is restored and the engaging part 52b enters the lower side of the engaging convex part 24 and is not separated therefrom. At this time, since the flange part 18b of the hook 18 is formed to be lower at a side of the jig receiving part 20, a position at which the jig receiving part 20 is engaged with the engaging part 52b is lower than a position at which the hook 18 is engaged with the wire 36, and is located at a side deviating rightwards from the lower of the position at which the hook 18 is engaged with the wire 36 in the vertical direction.

Figure 6:
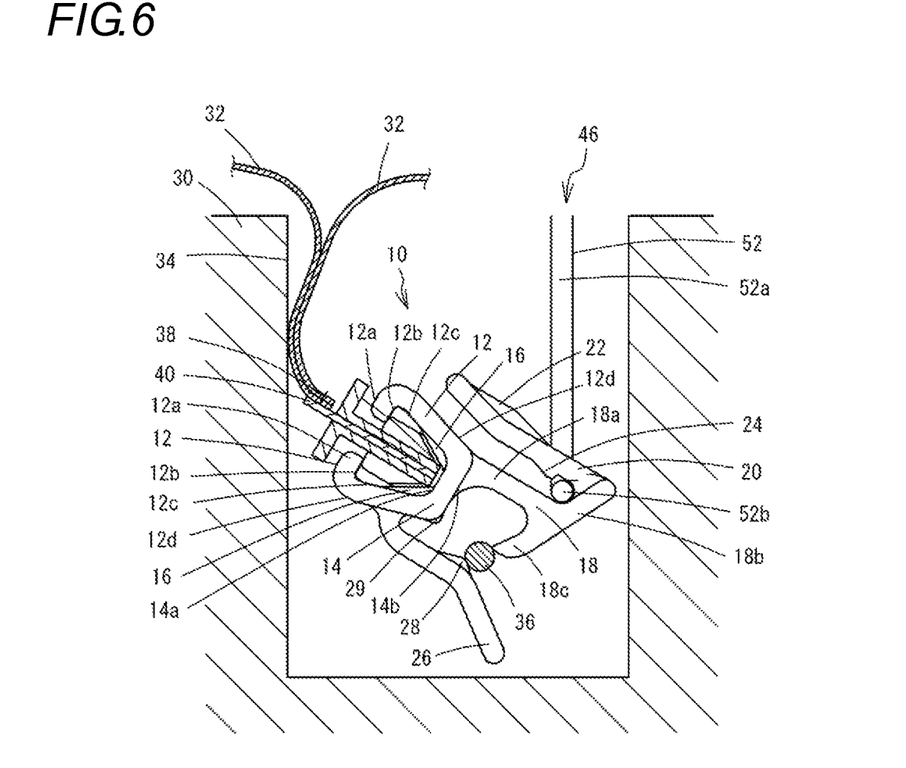
FIG. 6 is a longitudinally cross-sectional view showing the method of using the cover-material fastening clip according to the illustrative embodiment.

Then, the jig 46 is pulled up. Here, the pulling-up direction of the jig 46 coincides with the upper and lower direction of the cover-material fastening clip 10 and also coincides with the depth direction of the groove 34 of the cushion material 30. The opposite direction to the insertion direction of the end member 42 for engagement into the groove 34 coincides with the pulling-up direction of the jig 46 from the bottom part of the groove 34 of the cushion material 30 in the depth direction. When pulling up the jig 46, the engaging part 52b of the jig 46 is held in the jig holding space 25 of the jig receiving part 20 and is not separated therefrom, as shown in FIG. 6. Therefore, the cover-material fastening clip 10 is applied with moment of rotating the cover-material fastening clip about the wire 36 in conformity to movement of the engaging part 52b. The wire 36 is guided to the claw-shaped part 18c of the hook 18 and the engaging protrusion 28 of the guide lever 26 and is thus located in the gap between the guide lever 26 and the claw-shaped part 18c. When the cover-material fastening clip 10 is further pulled up, the wire 36 collides with the engaging protrusion 28 of the guide lever 26, so that the force is applied in a direction of opening the guide lever 26. Thereby, the guide lever 26 is elastically deformed and the wire 36 passes between the guide lever 26 and the claw-shaped part 18c, so that the cover-material fastening clip 10 is separated from the wire 36. Thereby, the cover material 32 is separated from the cushion material 30. Since the jig 46 is engaged to the extension part 18a of the hook 18 of the jig receiving part 20, the jig is still engaged to the jig receiving part 20 even after the cover-material fastening clip 10 is separated from the wire 36. However, it is possible to easily separate the jig by opening outwardly the jig receiving part 20 with a hand. Therefore, although the force with which the jig 46 is engaged with the jig receiving part 20 is stronger than the force with which the wire 36 is engaged with the hook 18, the jig 46 can be easily separated with a hand.kokokara According to the cover-material fastening clip 10 of this illustrative embodiment, it is possible to securely attach the cover material 32 to the cushion material 30 by engaging the cover-material fastening clip 10 with the wire 36 of the cushion material 30. Also, it is possible to separate the cover-material fastening clip 10 from the wire 36 by the jig 46 with the simple operation, so that the operation efficiency is high. When separating the cover-material fastening clip 10 from the wire 36, the jig 46 is engaged with the engaging convex part 24 just by inserting the jig 46 between the engaging claw 12 and the jig receiving part 20 from the upper. That is, the jig 46 can be easily inserted, is not easily separated and can be easily attached. Also, when the jig 46 is just pulled up in one direction, the cover-material fastening clip 10 is rotated about the axis of the wire 36 and the wire 36 is easily separated through the gap, which is widened as the guide lever 26 is elastically deformed, so that the engagement can be simply released. Therefore, it is not necessary to perform a difficult operation such as a twist operation in a specific direction, so that anybody can perform the operation.

When operating the jig 46, the cushion material 30 is not an obstacle, so that the cover-material fastening clip 10 of this illustrative embodiment can be simply operated in the groove 34 of the cushion material 30. Therefore, it is possible to effectively perform the operation with the weak force because it is not necessary to press and deform the cushion material 30 so as to enable the jig 46 to be seen. Since the jig receiving part 20 is provided in parallel with the engaging claw 12, it is possible to easily insert the jig 46, which also contributes to the operation efficiency.

The engaging claws 12 are provided with the stoppers 16 and the stoppers 16 are inserted into the engaging grooves 44 of the end member 42 for engagement, so that the cover-material fastening clip 10 is engaged at the predetermined position and is not moved in the longitudinal direction of the tape 40 for engagement. For this reason, the cover material 32 is not separated from the cushion material 30, a wrinkle or sagging is not caused in the cover material 32 and the cover material 32 can be cleanly attached to thus improve the outward appearance thereof. Since the end member 42 for engagement is provided with the engaging grooves 44 at an equal interval, the flexibility is increased, so that the operation can be easily performed.

Also, the guide lever 26 is provided with the bent part on the midst thereof, so that the guide lever 26 can be lengthened and can be easily bent by the elastic deformation. Since the guide lever 26 is connected to the engaging claw 12, it is possible to more lengthen the guide lever 26, compared to a configuration where the guide lever 26 is connected to the engaging claw base part 14. For this reason, even with the same material and the same cross-section shape, the guide lever 26 can be easily elastically-deformed and the wire 36 can easily pass.

Since the hook 18 is connected to the engaging claw base part 14 of the engaging claw 12, a load transmission path for fastening from the wire 36 to the engaging claw 12, the end member 42 for engagement, the tape 40 for engagement and the cover material 32 can be made to be linear and the cover material 32 can be securely fastened. The lower surface 14b of the engaging claw base part 14 is formed with the guide protrusion 29 that extends towards the guide lever 26. Therefore, even when the pit shape is formed between the vicinity of the connection part of the guide lever 26 and the engaging claw 12, the wire 36 is guided by the guide protrusion 29, so that it is possible to prevent the wire 36 from being unintentionally introduced into the pit shape.

In the meantime, in the cover-material fastening clip 10 of this illustrative embodiment, the engaging convex part 24 provided for the jig receiving part 20 may be provided for the hook 18. According to a cover-material fastening clip 54 shown in FIG. 8, an inner side surface of the extension part 18a of the hook 18, which faces the jig receiving part 20, is provided with an engaging convex part 56 in the vicinity of the flange part 18b. The engaging convex part 56 is a rib having a triangular shape towards the jig receiving part 20, a surface thereof close to the flange part 18b is positioned at a substantial right angle relative to the extension direction of the hook 18 and a surface thereof opposite to the flange part 18b intersects with the extension direction of the hook 18 at an obtuse angle. Although the flange part 18b continues from the extension part 18a at a substantial right angle, the outer side surface of the claw-shaped part 18c is formed to have the long inclination, so that the wire 36 is guided between the claw-shaped part 18c and the guide lever 26.

Figure 8:
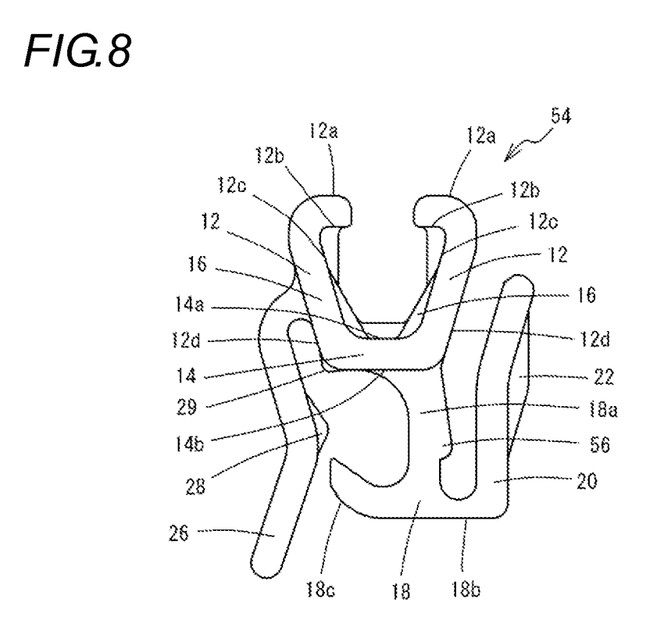
FIG. 8 is a front view showing a cover-material fastening clip according to a modified illustrative embodiment of the present invention.

The cover-material fastening clip 54 of this illustrative embodiment has the same effects as the cover-material fastening clip 10. The jig 46 is engaged with the engaging protrusion 56 just by inserting the jig 46 between the engaging claw 12 and the jig receiving part 20. That is, the jig 46 can be easily inserted, is not easily separated and can be easily attached. Also, when the jig 46 is just pulled up, the cover-material fastening clip 54 is rotated about the axis of the wire 36 and the wire 36 is easily separated through the gap, which is widened as the guide lever 26 is elastically deformed, so that the engagement can be simply released.

In the meantime, the cover-material fastening clip of the present invention is not limited to the above illustrative embodiments and the specific shape, size and the like thereof can be appropriately changed. The material, surface finishing, color and the like of the cover-material fastening clip can be freely selected. In the cover-material fastening clip, regarding the width in the thickness direction intersecting with the facing direction of the pair of engaging claws, the engaging claw and the engaging claw base part are set to be relatively wide and the hook, the jig receiving part and the guide lever are set to be relatively narrow. However, the widths may be the same or may be set to be contrary thereto. However, the widths of the guide lever and the jig receiving part are preferably set to be narrow so as to secure the deformation performance. Although the tip end of the engaging claw is chamfered, it may be rectangular. However, the chamfered shape can reduce the interference with the end member for engagement. The rib provided for the jig receiving part may be appropriately omitted. However, when the rib is provided, it is possible to securely transmit the force applied from the jig to the jig receiving part, thereby easily attaching/detaching the cover-material fastening clip. The means for engaging the jig to the jig receiving part may be a recess part and the like, in addition to the engaging protrusion, and may be provided for any of the jig receiving part and the hook.

What is claimed is:

1. A cover-material fastening clip for connecting a cover material and a cushion material, the cover-material fastening clip comprising:
    an engaging part configured to be engaged with an end member for engagement provided at an end edge of the cover material; and
    a hook configured to be engaged with a wire provided in a groove of the cushion material,
    wherein the hook is provided below the engaging part and is formed with:
        a claw-shaped part protruding laterally and configured to be engaged with the wire; and
        a jig receiving part provided at a side opposite to the claw-shaped part and configured to be engaged with a jig for separating the hook from the wire,
    wherein a position at which the jig receiving part is engaged with the jig is located at a side opposite to the engaging part relative to a position at which the hook is engaged with the wire, and is located lateral to the hook, and
    wherein when the jig is engaged with the jig receiving part and is pulled up in a state where the hook is engaged with the wire, the cover-material fastening clip is rotated about an axis of the wire and the wire is separated from the claw-shaped part of the hook, so that the connection between the cover material and the cushion material is released,
    wherein the hook has an extension part extending downward from the engaging part, and
    wherein an inner side surface of the jig receiving part, which faces the extension part or an inner side surface of the extension part, which faces the jig receiving part is provided with an engaging convex part.

2. The cover-material fastening clip according to claim 1, wherein the engaging part, the hook and the jig receiving part are integrally formed of a synthetic resin.

3. The cover-material fastening clip according to claim 1, wherein the jig receiving part extends parallel with the extension part, a tip end of the jig receiving part is positioned above an engaging claw base part of the engaging part, and an insertion opening into which the jig is inserted is formed between the tip end of the jig receiving part and the engaging part.

4. The cover-material fastening clip according to claim 3, further comprising a guide lever extending integrally from the engaging part and facing a tip end of the claw-shaped part of the hook,
    wherein the guide lever is formed so as to extend downwardly beyond the tip end of the claw-shaped part of the hook.

5. The cover-material fastening clip according to claim 3, wherein a bottom part of a U-shaped groove between the jig receiving part and the extension part is a jig holding space for engagement with the jig,
    wherein an inner side surface of the jig receiving part, which faces the extension part or an inner side surface of the extension part, which faces the jig receiving part is provided with an engaging convex part,
    wherein a gap between the engaging convex part and the extension part or the jig receiving part is set to be smaller than an outer diameter of an engaging part of the jig, and
    wherein when the engaging part of the jig is inserted between the extension part and the jig receiving part, the engaging part collides with the engaging convex part and the jig receiving part is elastically deformed to widen the gap, and when the engaging part passes over the engaging convex part, the engaging part is engaged with the engaging convex part.

6. The cover-material fastening clip according to claim 1, wherein the hook has:
    the claw-shaped part bent laterally from a tip end of the extension part and inclined towards the engaging part; and
    a flange part extending in an opposite direction to an extension direction of the claw-shaped part of the extension part, and
    wherein a tip end of the flange part is inclined in a direction away from the engaging part and is provided with the jig receiving part.

7. The cover-material fastening clip according to claim 6, further comprising a guide lever extending integrally from the engaging part and facing a tip end of the claw-shaped part of the hook,
    wherein the guide lever is formed so as to extend downwardly beyond the tip end of the claw-shaped part of the hook.

8. The cover-material fastening clip according to claim 6, wherein a bottom part of a U-shaped groove between the jig receiving part and the extension part is a jig holding space for engagement with the jig,
    wherein an inner side surface of the jig receiving part, which faces the extension part or an inner side surface of the extension part, which faces the jig receiving part is provided with an engaging convex part,
    wherein a gap between the engaging convex part and the extension part or the jig receiving part is set to be smaller than an outer diameter of an engaging part of the jig, and
    wherein when the engaging part of the jig is inserted between the extension part and the jig receiving part, the engaging part collides with the engaging convex part and the jig receiving part is elastically deformed to widen the gap, and when the engaging part passes over the engaging convex part, the engaging part is engaged with the engaging convex part.

9. A cover-material fastening clip for connecting a cover material and a cushion material, the cover-material fastening clip comprising:
    an engaging part configured to be engaged with an end member for engagement provided at an end edge of the cover material; and
    a hook configured to be engaged with a wire provided in a groove of the cushion material,
    wherein the hook is provided below the engaging part and is formed with:

a claw-shaped part protruding laterally and configured to be engaged with the wire; and a jig receiving part provided at a side opposite to the claw-shaped part and configured to be engaged with a jig for separating the hook from the wire, wherein a position at which the jig receiving part is engaged with the jig is located at a side opposite to the engaging part relative to a position at which the hook is engaged with the wire, and is located lateral to the hook, wherein when the jig is engaged with the jig receiving part and is pulled up in a state where the hook is engaged with the wire, the cover-material fastening clip is rotated about an axis of the wire and the wire is separated from the claw-shaped part of the hook, so that the connection between the cover material and the cushion material is released, wherein the hook has an extension part extending downwardly from the engaging part, and wherein the jig receiving part extends parallel with the extension part, a tip end of the jig receiving part is positioned above an engaging claw base part of the engaging part, and an insertion opening into which the jig is inserted is formed between the top end of the jig receiving part and the engaging part.

10. The cover-material fastening clip according to claim 9, wherein an inner side surface of the jig receiving part, which faces the extension part or an inner side surface of the extension part, which faces the jig receiving part is provided with an engaging convex part.

\* \* \* \* \*